United States Patent
Xie et al.

(10) Patent No.: US 10,451,434 B2
(45) Date of Patent: Oct. 22, 2019

(54) INFORMATION INTERACTION METHOD AND DEVICE

(71) Applicant: Beijing Xiaomi Mobile Software Co., Ltd., Beijing (CN)

(72) Inventors: Yan Xie, Beijing (CN); Yue Cheng, Beijing (CN); Longxiang Wan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/686,731

(22) Filed: Aug. 25, 2017

(65) Prior Publication Data
US 2018/0058876 A1    Mar. 1, 2018

(30) Foreign Application Priority Data
Aug. 25, 2016 (CN) .......................... 2016 1 0728291

(51) Int. Cl.
*G01C 21/36* (2006.01)
*G01C 21/34* (2006.01)

(52) U.S. Cl.
CPC ..... *G01C 21/3644* (2013.01); *G01C 21/3438* (2013.01); *G01C 21/362* (2013.01); *G01C 21/3605* (2013.01)

(58) Field of Classification Search
CPC ............ G01C 21/3644; G01C 21/3438; G01C 21/3605; G01C 21/362
See application file for complete search history.

(56) References Cited

U.S. PATENT DOCUMENTS

| 2011/0183627 A1* | 7/2011 | Ueda ............... G01C 21/3438 455/67.11 |
| 2011/0300876 A1* | 12/2011 | Lee ................. G01C 21/3438 455/456.1 |

FOREIGN PATENT DOCUMENTS

| CN | 101118162 A | * | 2/2008 |
| CN | 101118162 A | | 2/2008 |
| CN | 101319900 A | | 12/2008 |
| CN | 101769755 A | | 7/2010 |
| CN | 103376110 A | | 10/2013 |
| CN | 103902555 A | | 7/2014 |
| EP | 2 015 027 A2 | | 1/2009 |
| EP | 2 333 486 A1 | | 6/2011 |
| EP | 2 393 265 A2 | | 12/2011 |
| EP | 2 395 326 A2 | | 12/2011 |

OTHER PUBLICATIONS

Machine Translation CN101118162A, Feb. 6, 2008 (Year: 2008).*
Extended European Search Report issued by the European Patent Office dated Jan. 30, 2018, in counterpart European Application No. 17187888.7.
(Continued)

*Primary Examiner* — Anne M Antonucci
*Assistant Examiner* — Renee LaRose
(74) *Attorney, Agent, or Firm* — Finnegan, Henderson, Farabow, Garrett & Dunner LLP

(57) ABSTRACT

An information interaction method and device. The method includes: acquiring a destination; displaying a real scene picture of a landmark at the destination; and sending the real scene picture of the destination landmark to a specified friend.

9 Claims, 10 Drawing Sheets

(56) References Cited

OTHER PUBLICATIONS

Raul Rosso, How to share locations on WhatsApp, Mar. 24, 2015, XP055440428. Retrieved from the Internet:URL:https://blog.en.uptodown.com/share-locations-whatsapp/.
First Office Action issued by the State Intellectual Property Office (SIPO) of the People's Republic of China (PRC) dated Dec. 25, 2018, in counterpart Chinese Patent Application No. 201610728291.5.

* cited by examiner

INFORMATION INTERACTION METHOD AND DEVICE

CROSS-REFERENCE TO RELATED APPLICATIONS

This application is filed based upon and claims priority from Chinese Patent Application No. CN201610728291.5, filed on Aug. 25, 2016, the entire contents of which are incorporated herein by reference.

TECHNICAL FIELD

The present disclosure generally relates to the technical field of Internet, and more particularly, to an information interaction method and device.

BACKGROUND

With increasing improvement of material life, more and more people prefer to gather with friends or families on weekends or holidays, for example, having a holiday in a holiday village together or visiting a place such as a botanical garden or a playground. Two meeting parties may usually determine a fuzzy place which is not so accurate when determining where to meet. For example, they determine to meet at the Tiananmen Square, but the Tiananmen Square may further be subdivided into regions such as the Monument to the People's Heroes, the Tiananmen Rostrum, the Mausoleum of Mao Zedong and the like. For such a scenario, the two meeting parties may usually meet after a lot of troubles since they are unfamiliar with the meeting place, which occupies a relatively larger region or the like. This wastes a lot of time. Therefore, there is a need for an information interaction method for enabling two meeting parties to rapidly meet at a predetermined meeting place.

SUMMARY

According to a first aspect of embodiments of the present disclosure, there is provided an information interaction method. The method includes: acquiring a destination; displaying a real scene picture of a landmark at the destination; and sending the real scene picture of the destination landmark to a specified friend.

According to a second aspect of embodiments of the present disclosure, there is provided an information interaction device. The device includes: a processor; and a memory configured to store an instruction executable for the processor. The processor is configured to: acquire a destination; display a real scene picture of a landmark at the destination; and send the real scene picture of the destination landmark to a specified friend.

According to a third aspect of embodiments of the present disclosure, there is provided a non-transitory computer-readable storage medium having stored therein instructions that, when executed by a processor of a device, cause the device to perform an information interaction method. The method includes: acquiring a destination; displaying a real scene picture of a landmark at the destination; and sending the real scene picture of the destination landmark to a specified friend.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and serve to explain the principles of the present disclosure in conjunction with the description.

DETAILED DESCRIPTION

Figure 1:
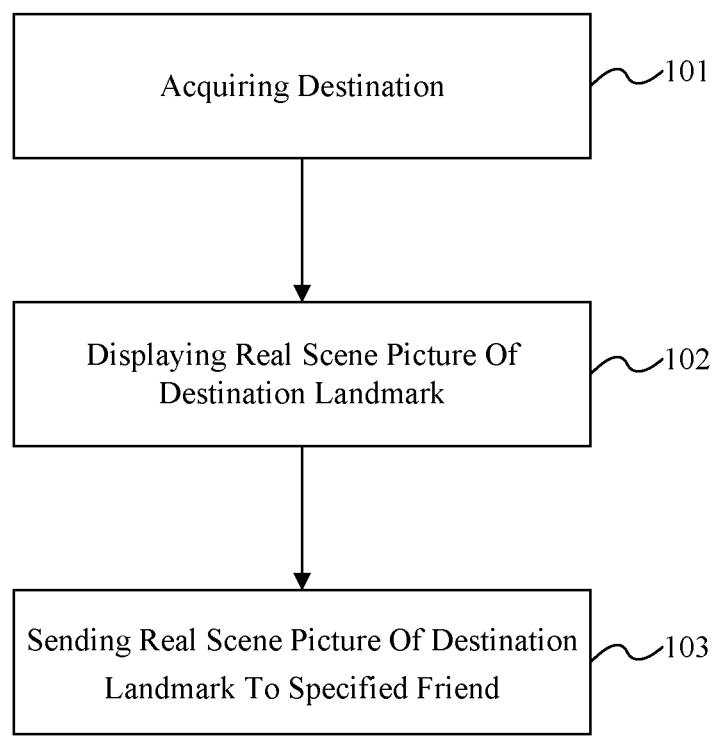
FIG. 1 is a flow chart showing an information interaction method according to an exemplary embodiment.

Exemplary embodiments will be described in detail below. Examples of the exemplary embodiments are illustrated in the accompanying drawings. The following description refers to the accompanying drawings in which the same reference numerals in different drawings represent the same or similar elements unless otherwise specified. The implementations set forth in the following description of exemplary embodiments do not represent all implementations consistent with the present disclosure. Instead, they are merely examples of apparatuses and methods consistent with some aspects of the present disclosure as recited in the appended claims.

FIG. 1 is a flow chart showing an information interaction method according to an exemplary embodiment. As shown in FIG. 1, the method is applied to a terminal, and includes the following steps.

In Step 101, a destination is acquired.

In Step 102, a real scene picture of a landmark at the destination is displayed.

In Step 103, the real scene picture of the destination landmark is sent to a specified friend.

According to the method provided by the embodiment of the present disclosure, after acquiring the destination, the terminal can automatically display the real scene picture of the destination landmark and send the real scene picture of the destination landmark to the other meeting party. In such a manner, one meeting party can receive the real scene picture of the destination landmark sent by the other meeting party before the two meeting parties meet or are in a meeting process, so that the two meeting parties can rapidly meet at a predetermined meeting place. Thus, the terminal is enabled to provide more useful information to the user.

In another embodiment, the real scene picture of the destination landmark includes a navigation link which is configured for navigation to the destination landmark after the specified friend receives and clicks the real scene picture of the destination landmark.

In another embodiment, acquiring the destination includes receiving an input from a user, or querying a chatting record of the user to identify the destination in appointment information.

In another embodiment, displaying the real scene picture of the destination landmark includes: selecting a prominent building as the destination landmark within a preset range according to one or more of a building height, a building area, a building color, a building photographing popularity, and a network search popularity; and acquiring the real scene picture of the destination landmark over a network, and displaying the real scene picture.

In another embodiment, selecting the prominent building as the destination landmark according to one or more of the building height, the building area, the building color, the building photographing popularity, and the network search popularity includes: generating a building candidate according to each combination of more than one of the building height, the building area, the building color, the building photographing popularity, and the network search popularity, displaying the building candidate, and receiving a selection instruction from the user to determine the destination landmark; or comprehensively performing a calculation to obtain the destination landmark according to the building height, the building area, the building color, the building photographing popularity, and the network search popularity.

In another embodiment, the method further includes: acquiring a geographical origin of the user, and planning route information from the geographical origin to the destination landmark; estimating time consumption for travelling to the destination landmark according to the route information; calculating a departure time for the user according to a set meeting moment and the time consumption; and displaying departure prompting information at the departure time, and starting route navigation to the destination landmark.

All of the abovementioned optional technical solutions may be freely combined into alternative embodiments of the present disclosure, which will not be elaborated one by one herein.

Figure 2A:
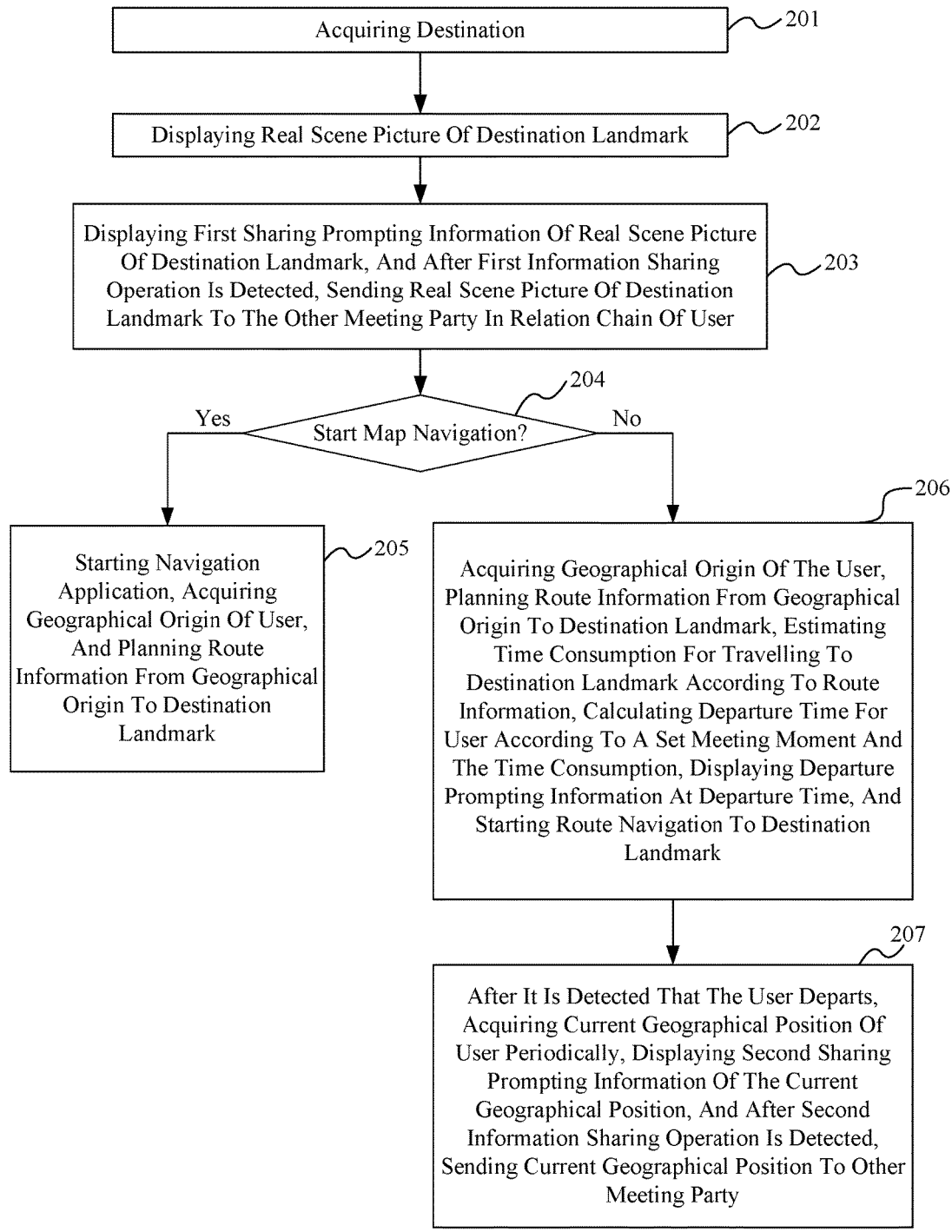
FIG. 2A is a flow chart showing an information interaction method according to an exemplary embodiment.

FIG. 2A is a flow chart showing an information interaction method according to an exemplary embodiment. As shown in FIG. 2A, the method includes the following steps.

In Step 201, a destination is acquired.

In the embodiment of the present disclosure, acquisition of the destination can be implemented in at least the following two manners.

In a first manner, an input is received from a user.

For the first manner, for example, after two meeting parties verbally determine a meeting place in a manner of voice communication and the like, one meeting party inputs a destination through a search input box provided by a navigation application and the like to query route information for the destination, and then a terminal acquires information, input by the user, about the destination.

In a second manner, a chatting record of the user is queried to identify the destination in appointment information.

For the second manner, people usually perform information interaction by using an instant messaging application at present, and the two meeting parties are also likely to determine the meeting place through the instant messaging application. In such case, the information about the destination can be acquired by querying the chatting record of the user. The appointment information mentioned above refers to interaction information sent when the two meeting parties determine the meeting place. The appointment information includes, but is not limited to, information of a picture form, a voice form, a text form, a link of an image-text form or the like. For example, place information appearing in the appointment information is identified, and the identified place information is determined as the destination. Alternatively, if multiple pieces of place information are identified, the multiple pieces of place information are displayed to the user who can select a place as the destination. For another example, after a clicking operation of the user over a picture in the appointment information is received, a building in the picture is automatically identified, the navigation application is started. The building in the picture is set as a navigation termination, i.e. the destination.

In Step 202, a real scene picture of a destination landmark is displayed.

Here, the destination landmark refers to a popular or prominent building which is representative and familiar to people. For example, destination landmarks of Beijing include the Imperial Palace, the Bird's Nest, the Water Cube, and the like. Displaying of the real scene picture of the destination landmark can be implemented by selecting a prominent building as the destination landmark from a preset range according to one or more of a building height, a building area, a building color, a building photographing popularity, and a network search popularity; acquiring the real scene picture of the destination landmark over a network; and displaying the real scene picture.

Figure 2B:
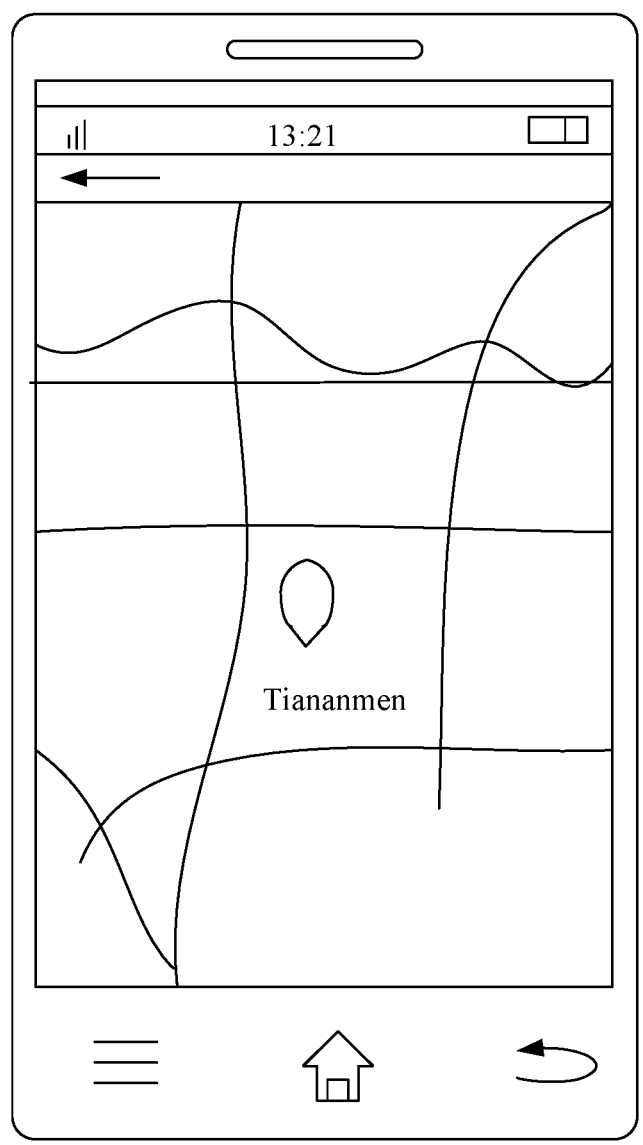
FIG. 2B is a schematic diagram illustrating a terminal according to an exemplary embodiment.

Here, the preset range refers to a certain geographical range in the vicinity of the destination. The preset range can be determined by a server, or automatically determined by the terminal. As shown in FIG. 2B, after the user determines the destination through the navigation application, the terminal sends position information of the destination to the server, and then the server determines the preset range according to the position information of the destination and stored map data. For example, if the meeting place is determined to be the Tiananmen Square, it is well known that the Tiananmen Square occupies a very large area and includes numerous buildings. Thus, such a meeting place is very fuzzy, and difficulties in meeting of the two meeting parties are increased. When the preset range is determined, for example, the server determines a circumference of 1.5 km or a larger region centered on the Monument to the People's Heroes as the preset range to cover the whole Tiananmen Square as much as possible. As another example, if a fitness center is determined as the destination, a circumference of hundreds of meters or a larger region centered on the fitness center is determined as the preset range. Alternatively, the terminal can independently determine the preset range according to the destination and stored offline map data in a similar manner, which will not be specifically limited in the embodiment of the present disclosure.

Determination of the destination landmark within the preset range can be implemented according to one or more of the building height, the building area, the building color, the building photographing popularity, and the network search popularity within the preset range. A relatively taller building, or a building occupying a relatively larger area or a building in a relatively more striking color may attract attentions of people more easily. Therefore, the abovementioned factors are adopted as determination conditions for the destination landmark in the embodiment of the present disclosure. Here, the building photographing popularity can be measured by a number of photos of people together with the building or a photographing frequency of the building taken by people. When a photographing popularity of a building is relatively high, it is indicated that a probability that the building is familiar to people is relatively high. Therefore, the building photographing popularity is adopted as a determination condition for the destination landmark.

The network search popularity is similar to the building photographing popularity. Here, the network search popularity can be measured by a number of times for which the building is searched for. When the number of times for which the building is searched for is high, it is indicated that a probability that the building is familiar to people is relatively high. Thus, the network search popularity is also adopted as a determination condition for the destination landmark. In another embodiment, selection of the prominent building as the destination landmark can be implemented in the following two manners without limitation.

In a first manner, a building candidate is generated and displayed according to each combination of more than one of the building height, the building area, the building color, the building photographing popularity, and the network search popularity, and a selection instruction is received from the user to determine the destination landmark.

For the first manner, multiple building candidates can be generated according to multiple combinations of more than one of the building height, the building area, the building color, the building photographing popularity, and the network search popularity, and the multiple building candidates are displayed to the user. The user determines the destination landmark from the multiple building candidates.

Figure 2C:
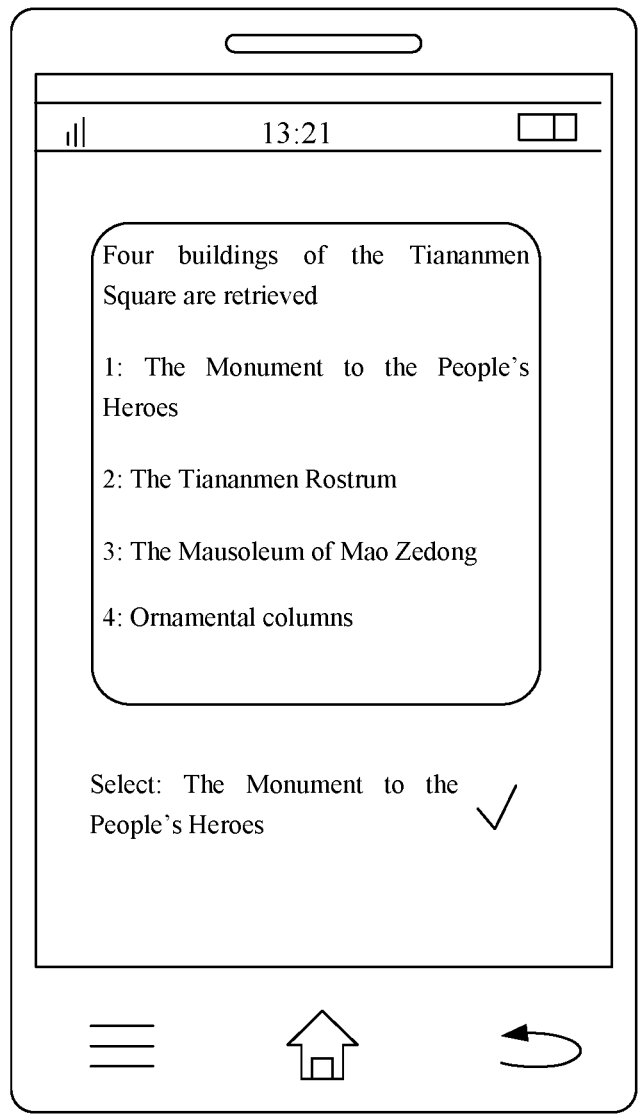
FIG. 2C is a schematic diagram illustrating a terminal according to an exemplary embodiment.

For example, a building candidate is generated according to the building height, the building area, and the building color, or a building candidate is generated according to the building area, the building color, and the building photographing popularity, or a building candidate is generated according to the building color, the building photographing popularity, and the network search popularity. The multiple factors can be combined in any manner, which will not be specifically limited in the embodiment of the present disclosure. After the multiple building candidates are generated, as shown in FIG. 2C, the terminal displays identification information of the multiple building candidates. For example, the Monument to the People's Heroes, the Tiananmen Rostrum, the Mausoleum of Mao Zedong, ornamental columns, and the like are displayed. When a selection operation of the user over the identification information of any building candidate is detected, the terminal determines the building candidate indicated by the selected identification information as the determination landmark. For example, the Monument to the People's Heroes is determined as the destination landmark.

In a second manner, the destination landmark is obtained by comprehensively performing a calculation according to the building height, the building area, the building color, the building photographing popularity, and the network search popularity.

For the second manner, the terminal independently and directly performs comprehensive calculation to obtain the destination landmark according to the building height, the building area, the building color, the building photographing popularity, and the network search popularity, without selection performed by the user. When calculating the destination landmark, a weight can be assigned to each factor. A relatively higher weight is assigned to the factor with relatively greater influence on a calculation result, and a relatively lower weight is assigned to the factor with relatively less influence on the calculation result. For example, the building color can have greater influence than the building area, so that the weight corresponding to the building color is higher than the weight corresponding to the building area. Here, each factor can be obtained by big data statistics, which will not be specifically limited in the embodiment of the present disclosure.

It is to be noted that the destination landmark can be independently determined by the terminal, or determined with assistance of the server. For example, when the destination is acquired, the terminal sends the position information of the destination to the server, and then the server can determine the destination landmark by adopting a similar determination manner, which will also not be specifically limited in the embodiment of the present disclosure.

In another embodiment, acquisition of the real scene picture of the destination landmark also adopts, but is not limited to, the following two manners.

In a first manner, the terminal acquires a network picture of the destination landmark from the server, and determines the network picture as the real scene picture of the destination landmark.

Figure 2D:
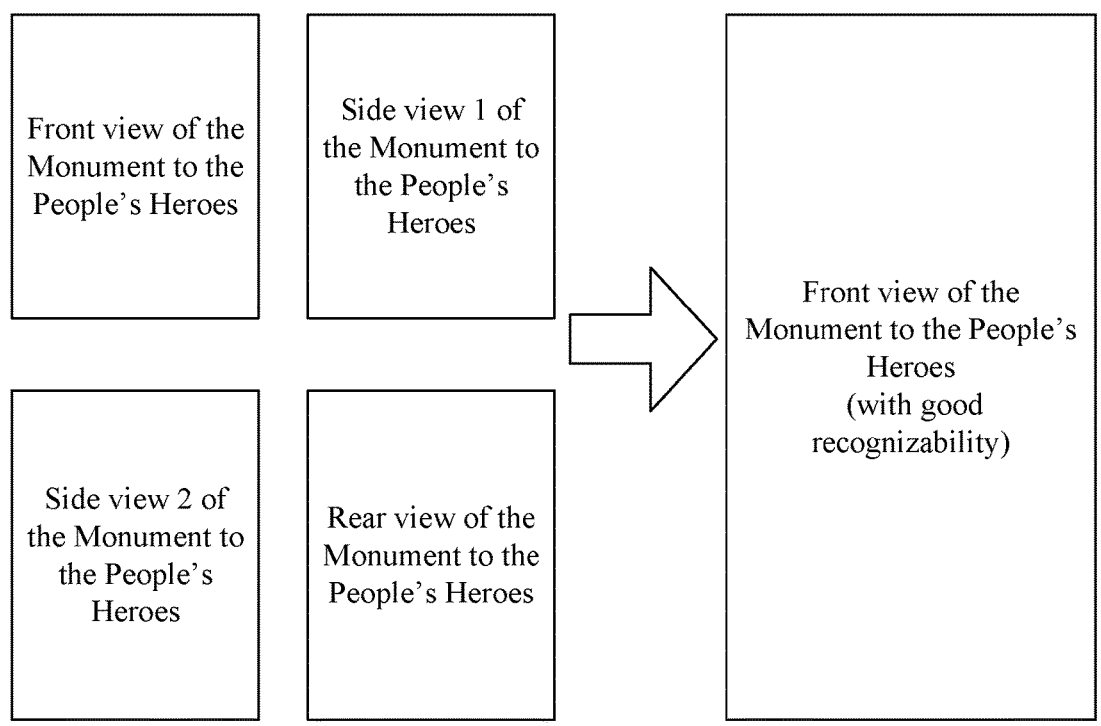
FIG. 2D is a schematic diagram illustrating selection of a real scene picture according to an exemplary embodiment.

For the first manner, the terminal uploads identification information of the destination landmark to the server. When the identification information is received, the server selects a representative real scene picture as the real scene picture of the destination landmark according to the following rule. For example, when a destination landmark occupies a very large area, the destination landmark may include multiple gates, or a size of each side of the landmark is very large. Therefore, it is also necessary to select a picture with a relatively higher identification degree from multiple real scene pictures, as shown in FIG. 2D. For example, the server obtains photos shot by other users at the destination landmark by big data statistics, and obtains a picture with most shooting angles, at a most obvious place, or with a good recognizability as the real scene picture of the destination landmark by performing calculation and analysis of the photos. For example, a front picture of the destination landmark is selected as the real scene picture of the destination landmark, as shown in FIG. 2D.

In a second manner, the terminal acquires a real scene map picture through the navigation application, and acquires the real scene picture of the destination landmark from the real scene map picture according to the destination landmark.

Figure 2E:
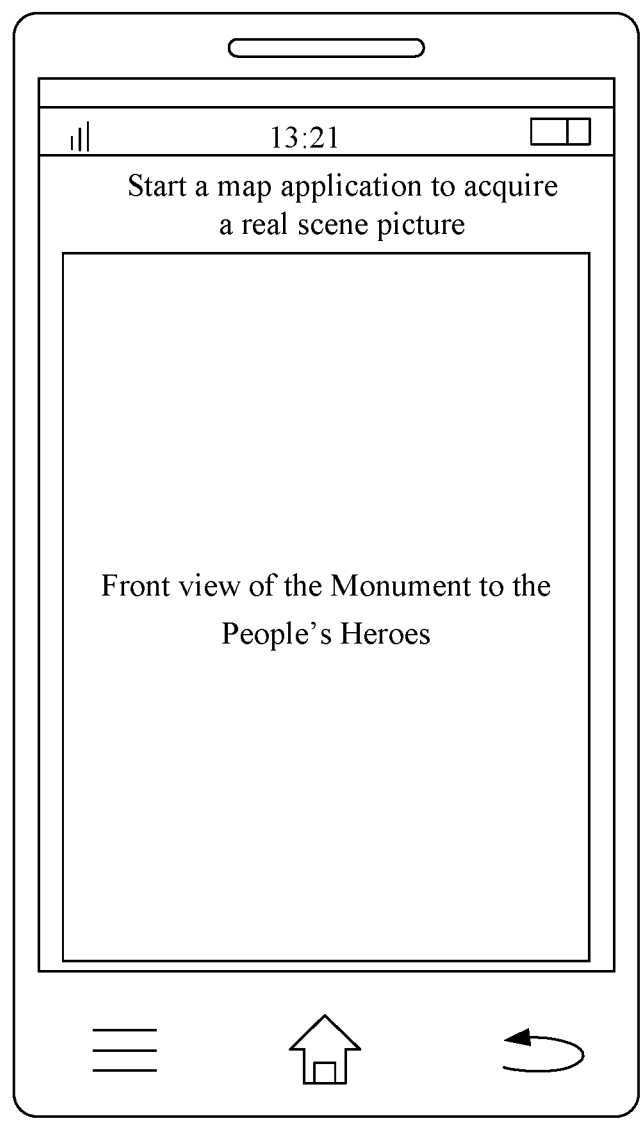
FIG. 2E is a schematic diagram illustrating a terminal according to an exemplary embodiment.

For the second manner, after starting the navigation application, the terminal acquires the real scene map picture from the locally stored offline map data at first. The terminal then searches the real scene map picture for the real scene picture of the destination landmark shown in FIG. 2E according to the identification information of the destination landmark. When searching the real scene picture, a picture with a relatively higher recognizability will be selected. For example, a front real scene picture of the Monument to the People's Heroes is selected.

In addition, in some circumstances, a destination may be at a certain distance away from a destination landmark. For ensuring that the other meeting party can rapidly travel to the destination after reaching the vicinity of the destination landmark, in the embodiment of the present disclosure, navigation information from the destination landmark to the destination can also be acquired, and the navigation information is sent to the other meeting party. If one meeting party knows about a geographical position of the other meeting party, navigation information from the geographical position of the other meeting party to the destination landmark can also be acquired, which will not be specifically limited in the embodiment of the present disclosure. Here, the navigation information can be contained in the real scene picture of the destination landmark. That is, the real scene picture of the destination landmark includes a navigation link, and after the navigation link is received by the other meeting party, and the other meeting party clicks the real scene picture of the destination landmark, the navigation application is automatically started for navigation to the destination landmark on the basis of the navigation link.

In Step 203, first sharing prompting information of the real scene picture of the destination landmark is displayed, and when a first information sharing operation is detected, the real scene picture of the destination landmark is sent to the other meeting party on a relation chain of the user.

Figure 2F:
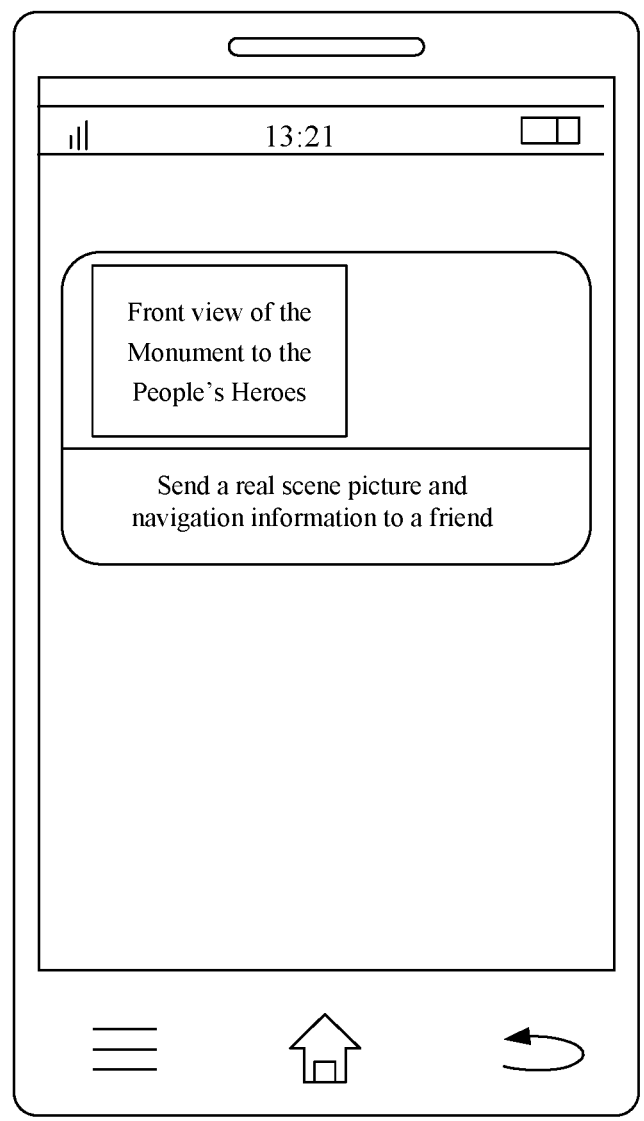
FIG. 2F is a schematic diagram illustrating a terminal according to an exemplary embodiment.

In the embodiment of the present disclosure, the obtained real scene picture of the destination landmark can be sent to the other meeting party through the instant messaging application. Specifically, the first sharing prompting information of the real scene picture of the destination landmark can be displayed, as shown in FIG. 2F. When a clicking operation over the first sharing prompting information is detected, it is determined that a first information sharing operation is detected, the instant messaging application is woken up. When a clicking operation of the user over a sharing button is detected, the terminal displays a relation chain page of the user for the user to select a party to whom the picture will be sent. After a clicking operation on any friend identifier in the relation chain of the user is detected, the real scene picture of the destination landmark is sent to the other meeting party on the relation chain of the user.

In Step 204, prompting information about whether to start map navigation is displayed. When a confirmation operation for starting map navigation is detected, Step 205 will be executed, and when the confirmation operation for starting map navigation is not detected, Step 206 will be executed.

In the embodiment of the present disclosure, after the real scene picture of the destination landmark is sent to the other meeting party, for enabling the current user to reach the destination landmark, whether to start map navigation can also be prompted to the user. When the user needs to immediately start, map navigation is confirmed to be started. After the navigation application is started, a geographical origin of the user can be automatically determined so as to plan route information from the geographical origin to the destination landmark, and map navigation can be provided for the user by using both an interface display and a voice broadcast. When the user currently needs not to depart, a moment when the user should depart can be estimated, and the user can be automatically prompted at the estimated departure time. Details of the procedure will be described in Step 206.

In Step 205, when the confirmation operation for starting map navigation is detected, the navigation application is started, the geographical origin of the user is acquired, and the route information from the geographical origin to the destination landmark is planned.

In Step 206, when the confirmation operation for starting map navigation is not detected, the geographical origin of the user is acquired, the route information from the geographical origin to the destination landmark is planned, time consumption for travelling to the destination landmark is estimated according to the route information, the departure time for the user is calculated according to a set meeting moment and the time consumption, departure prompting information is displayed at the departure time, and route navigation to the destination landmark is started.

In the embodiment of the present disclosure, after the terminal acquires the geographical origin of the user and the set meeting moment, if the user selects a travel tool, the terminal can independently estimate the time consumption for travelling to the destination landmark according to the route information, calculate the departure time for the user according to the meeting moment and the time consumption, display the departure prompting information at the departure time, and start route navigation for the destination landmark. The time consumption is obtained according to factors such as a traffic condition and a weather condition. For example, traffic information and weather information can be acquired, and then the time consumption is calculated according to a route. For example, when the meeting moment is nine o'clock, if the time consumption is an hour by driving, the user can be prompted at eight o'clock to depart right now. Here, the departure prompting information can be voice prompting information or text prompting information, which will not be specifically limited in the embodiment of the present disclosure.

In Step 207, after it is detected that the user has departed, a current geographical position of the user is acquired periodically, second sharing prompting information of the current geographical position is displayed, and after a second information sharing operation is detected, the current geographical position is sent to the other meeting party.

In the embodiment of the present disclosure, after the user has departed, the navigation application can also regularly acquire the current geographical position of the user. For example, the current geographical position of the user is acquired with a time interval of 5 minutes. The second sharing prompting information of the current geographical position is then displayed. When the user confirms to share the current geographical position, that is, after the terminal detects the second information sharing operation, the current geographical position is sent to the other meeting party through the instant messaging application, such that the other meeting party can timely learn about the current position of the user, thereby estimating an arrival time of the user.

According to the method provided by the embodiment of the present disclosure, when the destination is acquired, the terminal can automatically display the real scene picture of the destination landmark and send the real scene picture of the destination landmark to the other meeting party. In such a manner, one meeting party can receive the real scene picture of the destination landmark sent by the other meeting party before the two meeting parties meet or are in a meeting process. As such, the two meeting parties can rapidly meet at a predetermined meeting place. Thus, the terminal is enabled to provide more useful information to the user.

Figure 3:
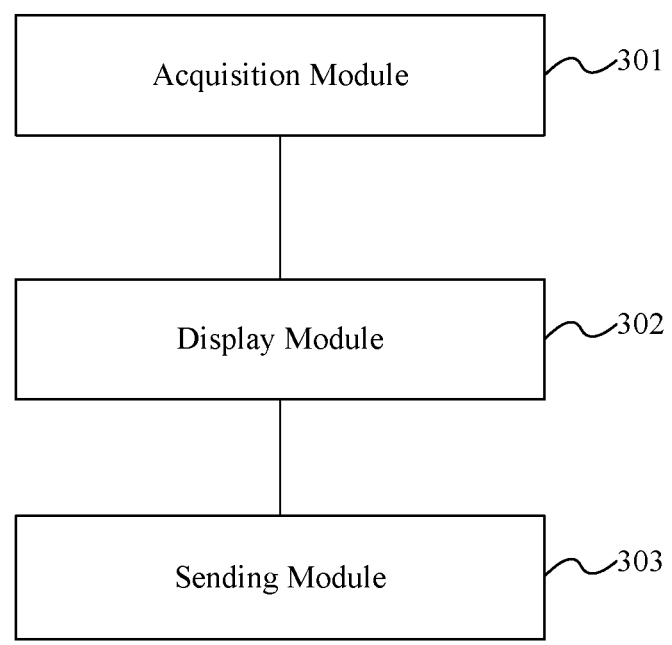
FIG. 3 is a block diagram of an information interaction device according to an exemplary embodiment.

FIG. 3 is a block diagram of an information interaction device according to an exemplary embodiment. Referring to FIG. 3, the device includes an acquisition module 301, a display module 302, and a sending module 303.

The acquisition module 301 is configured to acquire a destination.

The display module 302 is configured to display a real scene picture of a destination landmark.

The sending module 303 is configured to send the real scene picture of the destination landmark to a specified friend.

In another embodiment, the real scene picture of the destination landmark includes a navigation link. The navigation link is configured for navigation to the destination landmark after the specified friend receives and clicks the real scene picture of the destination landmark.

In another embodiment, the acquisition module 301 is configured to receive an input from a user or query a chatting record of the user, so as to identify the destination in appointment information.

In another embodiment, the display module 302 is configured to select a prominent building as the destination landmark from a preset range according to one or more of a building height, a building area, a building color, a building photographing popularity and a network search popularity, and acquire the real scene picture of the destination landmark over a network and display the real scene picture.

In another embodiment, the display module 302 is configured to generate and display a building candidate according to each combination of more than one of the building height, the building area, the building color, the building photographing popularity and the network search popularity, and receive a selection instruction from the user to determine the destination landmark. Alternatively, the display module 302 is configured to comprehensively perform a calculation to obtain the destination landmark according to the building height, the building area, the building color, the building photographing popularity and the network search popularity.

Figure 4:
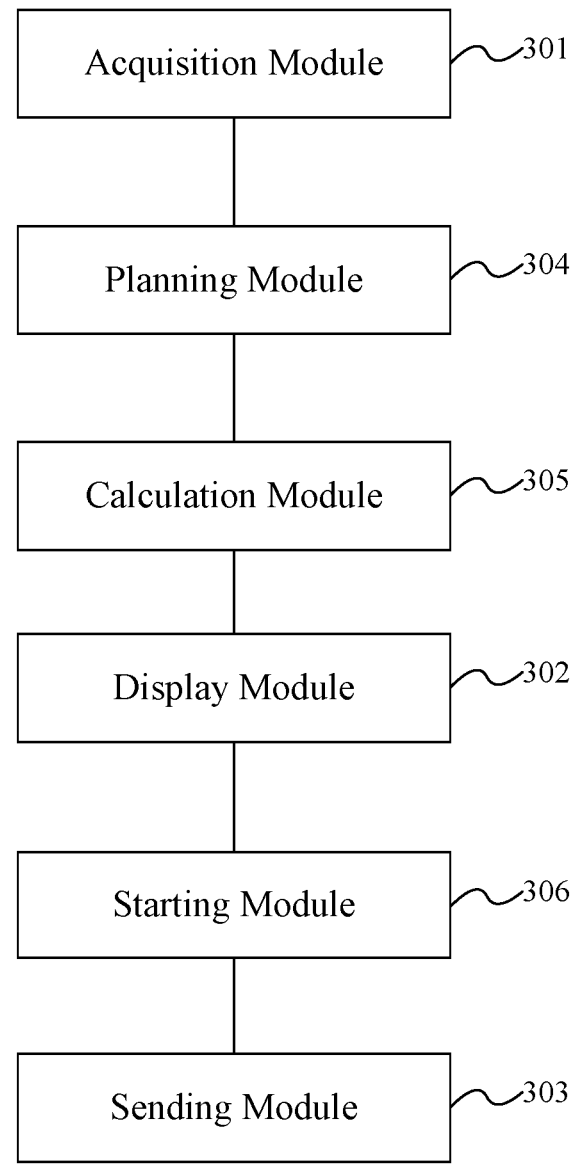
FIG. 4 is a block diagram of an information interaction device according to an exemplary embodiment.

In another embodiment, as shown in FIG. 4, in addition to the acquiring module 301, display module 302 and sending module 303, the device can further include a planning module 304, a calculation module 305, and a starting module 306.

The acquisition module 301 is further configured to acquire a geographical origin of the user.

The planning module 304 is configured to plan route information from the geographical origin to the destination landmark.

The calculation module 305 is configured to estimate time consumption for travelling to the destination landmark according to the route information.

The calculation module 305 is further configured to calculate a departure time for the user according to a set meeting moment and the time consumption.

The display module 302 is further configured to display departure prompting information at the departure time.

The starting module 306 is configured to start route navigation to the destination landmark.

According to the device provided by the embodiment of the present disclosure, when the destination is acquired, a terminal will automatically display the real scene picture of the destination landmark and send the real scene picture of the destination landmark to the other meeting party. In such a manner, one meeting party can receive the real scene picture of the destination landmark sent by the other meeting party before the two meeting parties meet or are in a meeting process. As such, the two meeting parties can rapidly meet at a predetermined meeting place. Thus, the terminal is enabled to provide more useful information to the user.

With respect to the devices in the above embodiments, the implementations for performing operations for individual modules therein have been described in detail in the embodiments regarding the methods, which will not be elaborated herein.

Figure 5:
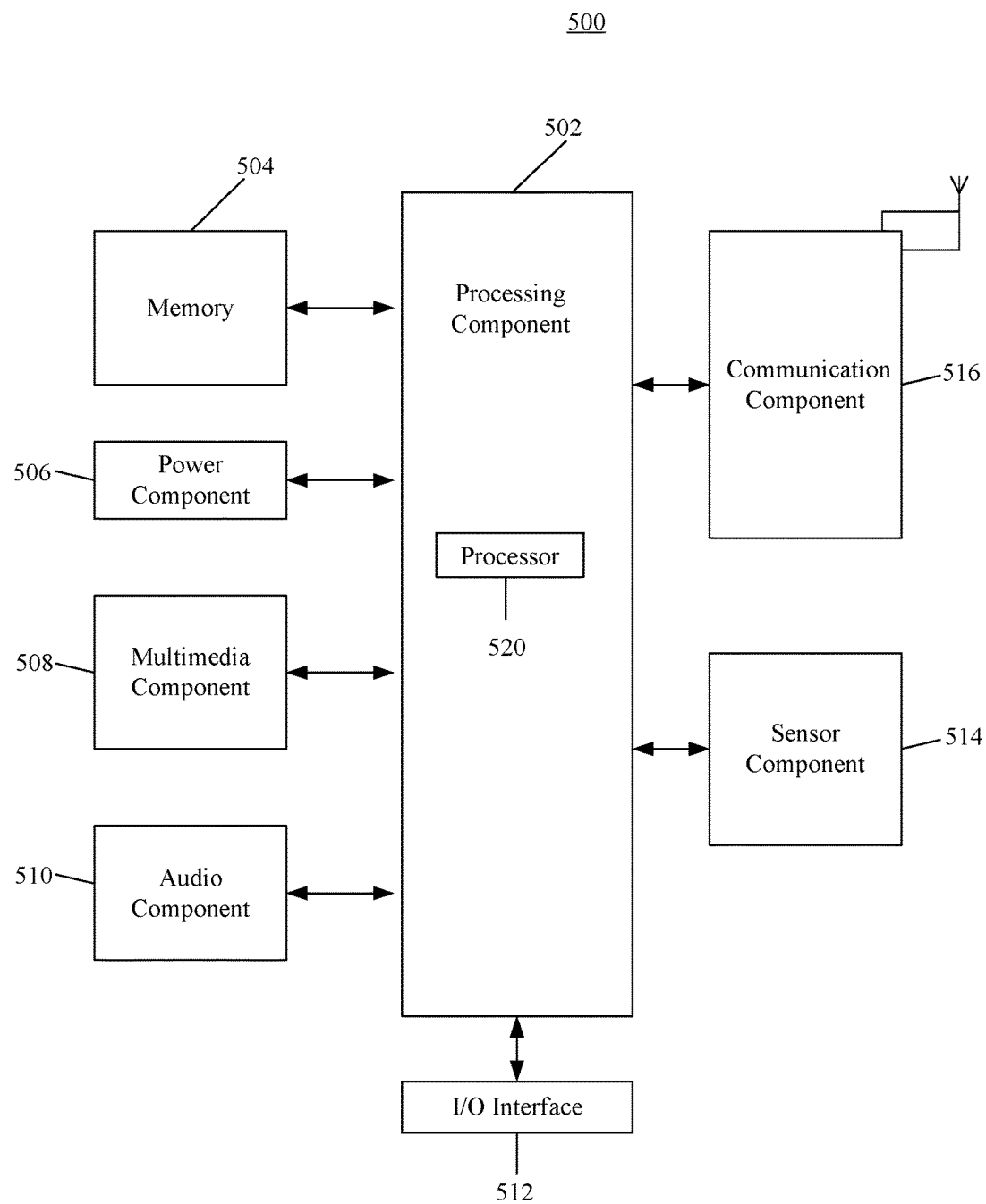
FIG. 5 is a block diagram of an information interaction device according to an exemplary embodiment.

FIG. 5 is a block diagram of an information interaction device 500 according to an exemplary embodiment. For example, the device 500 can be a mobile phone, a computer, a digital broadcast terminal, a messaging device, a gaming console, a tablet, a medical device, exercise equipment, a personal digital assistant or the like.

Referring to FIG. 5, the device 500 can include one or more of a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 can include one or more processors 520 to execute instructions to perform all or part of the steps in the abovementioned methods. Moreover, the processing component 502 can include one or more modules which facilitate interaction between the processing component 502 and the other components. For instance, the processing component 502 can include a multimedia module to facilitate interaction between the multimedia component 508 and the processing component 502.

The memory 504 is configured to store various types of data to support the operation of the device 500. Examples of such data include instructions for any application or methods operated on the device 500, contact data, phonebook data, messages, pictures, video, etc. The memory 504 can be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 can include a power management system, one or more power supplies, and other components associated with the generation, management and distribution of power for the device 500.

The multimedia component 508 includes a screen providing an output interface between the device 500 and a user. In some embodiments, the screen can include a Liquid Crystal Display (LCD) and a Touch Panel (TP). If the screen includes the TP, the screen can be implemented as a touch screen to receive an input signal from the user. The TP includes one or more touch sensors to sense touches, swipes and gestures on the TP. The touch sensors can not only sense a boundary of a touch or swipe action, but also sense a duration and pressure associated with the touch or swipe action. In some embodiments, the multimedia component 508 includes a front camera and/or a rear camera. The front camera and/or the rear camera can receive external multimedia data when the device 500 is in an operation mode such as a photographing mode or a video mode. Each of the front camera and the rear camera can be a fixed optical lens system or have focusing and optical zooming capabilities.

The audio component 510 is configured to output and/or input an audio signal. For example, the audio component 510 includes a Microphone (MIC), and the MIC is configured to receive an external audio signal when the device 500 is in the operation mode, such as a call mode, a recording mode and a voice recognition mode. The received audio signal can be further stored in the memory 504 or sent through the communication component 516. In some embodiments, the audio component 510 further includes a speaker configured to output the audio signal.

The I/O interface 512 provides an interface between the processing component 502 and a peripheral interface module, and the peripheral interface module can be a keyboard, a click wheel, buttons or the like. The buttons can include, but not limited to, a home button, a volume button, a starting button and a locking button.

The sensor component 514 includes one or more sensors configured to provide status assessment in various aspects for the device 500. For instance, the sensor component 514 can detect an on/off status of the device 500 and relative positioning of components, such as a display and small keyboard of the device 500. The sensor component 514 can further detect a change in a position of the device 500 or a component of the device 500, presence or absence of contact between the user and the device 500, orientation or acceleration/deceleration of the device 500 and a change in temperature of the device 500. The sensor component 514 can include a proximity sensor configured to detect presence of an object nearby without any physical contact. The sensor component 514 can also include a light sensor, such as a Complementary Metal Oxide Semiconductor (CMOS) or Charge Coupled Device (CCD) image sensor, configured for use in an imaging application. In some embodiments, the sensor component 514 can also include an acceleration sensor, a gyroscope sensor, a magnetic sensor, a pressure sensor or a temperature sensor.

The communication component 516 is configured to facilitate wired or wireless communication between the device 500 and another device. The device 500 can access a communication-standard-based wireless network, such as a Wireless Fidelity (WiFi) network, a 2nd-Generation (2G), 3rd-Generation (3G), or 4th-Generation (4G) network or a combination thereof. In an exemplary embodiment, the communication component 516 receives a broadcast signal or broadcast associated information from an external broadcast management system through a broadcast channel. In an exemplary embodiment, the communication component 516 further includes a Near Field Communication (NFC) module to facilitate short-range communication. For example, the NFC module can be implemented on the basis of a Radio Frequency Identification (RFID) technology, an Infrared Data Association (IrDA) technology, an Ultra-WideBand (UWB) technology, a Bluetooth (BT) technology or another technology.

In an exemplary embodiment, the device 500 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components that are configured to execute the abovementioned method.

In an exemplary embodiment, there is also provided a non-transitory computer-readable storage medium containing instructions, such as the memory 504 containing instructions, and the instructions can be executed by the one or more processors 520 of the device 500 to implement the abovementioned method. For example, the non-transitory computer-readable storage medium can be a ROM, RAM, a Compact Disc Read-Only Memory (CD-ROM), a magnetic tape, a floppy disc, an optical data storage device and the like.

According to the non-transitory computer-readable storage medium, the instructions in the storage medium can be executed by a processor of a mobile terminal to enable the mobile terminal to execute the abovementioned information interaction methods.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An information interaction method, comprising:
   acquiring a destination;
   displaying a real scene picture of a landmark at the destination; and
   sending the real scene picture of the destination landmark to a specified friend,
   wherein the real scene picture of the destination landmark comprises a navigation link, and the navigation link is used for starting a navigation application to navigate to the destination landmark after the specified friend receives and clicks the real scene picture of the destination landmark, and
   wherein acquiring the destination comprises: querying a chatting record of a user to identify the destination in appointment information.

2. The method of claim 1, wherein displaying the real scene picture of the destination landmark comprises:
   selecting a prominent building as the destination landmark within a preset range according to one or more of a building height, a building area, a building color, a building photographing popularity, and a network search popularity; and
   acquiring the real scene picture of the destination landmark over a network, and displaying the real scene picture.

3. The method of claim 2, wherein selecting the prominent building as the destination landmark according to one or more of the building height, the building area, the building color, the building photographing popularity and the network search popularity comprises:
   generating a building candidate according to each combination of more than one of the building height, the building area, the building color, the building photographing popularity and the network search popularity;
   displaying the building candidate; and
   receiving a selection instruction from the user to determine the destination landmark;
   or
   comprehensively performing a calculation to obtain the destination landmark according to the building height, the building area, the building color, the building photographing popularity, and the network search popularity.

4. The method of claim 1, further comprising:
   acquiring a geographical origin of the user, and planning route information from the geographical origin to the destination landmark;
   estimating time consumption for travelling to the destination landmark according to the route information;
   calculating a departure time for the user according to a set meeting moment and the time consumption; and
   displaying departure prompting information at the departure time, and starting route navigation to the destination landmark.

5. An information interaction device, comprising:
   a processor; and
   a memory configured to store an instruction executable for the processor, wherein the processor is configured to:
acquire a destination;
display a real scene picture of a landmark at the destination; and
send the real scene picture of the destination landmark to a specified friend,
wherein the real scene picture of the destination landmark comprises a navigation link, and the navigation link is used for starting a navigation application to navigate to the destination landmark after the specified friend receives and clicks the real scene picture of the destination landmark,
wherein the processor is configured to query a chatting record of a user to identify the destination in appointment information.

6. The device of claim 5, wherein the processor is configured to:
select a prominent building as the destination landmark within a preset range according to one or more of a building height, a building area, a building color, a building photographing popularity and a network search popularity; and
acquire the real scene picture of the destination landmark over a network and display the real scene picture.

7. The device of claim 6, wherein the processor is configured to:
generate a building candidate according to each of more than one of the building height, the building area, the building color, the building photographing popularity, and the network search popularity;
display the building candidate; and
receive a selection instruction from the user to determine the destination landmark;
or
comprehensively performing a calculation to obtain the destination landmark according to the building height, the building area, the building color, the building photographing popularity, and the network search popularity.

8. The device of claim 5, wherein the processor is configured to
acquire a geographical origin of the user;
plan route information from the geographical origin to the destination landmark;
estimate time consumption for travelling to the destination landmark according to the route information;
calculate a departure time for the user according to a set meeting moment and the time consumption;
display departure prompting information at the departure time; and
start route navigation to the destination landmark.

9. A non-transitory computer-readable storage medium having stored therein instructions that, when executed by a processor of a device, cause the device to perform an information interaction method, the method comprising:
acquiring a destination;
displaying a real scene picture of a landmark at the destination; and
sending the real scene picture of the destination landmark to a specified friend,
wherein the real scene picture of the destination landmark comprises a navigation link, and the navigation link is used for starting a navigation application to navigate to the destination landmark after the specified friend receives and clicks the real scene picture of the destination landmark,
wherein acquiring the destination comprises: querying a chatting record of a user to identify the destination in appointment information.

* * * * *